(12) United States Patent
Sekine et al.

(10) Patent No.: US 10,160,002 B2
(45) Date of Patent: Dec. 25, 2018

(54) APPARATUS FOR COATING CATALYST SLURRY

(71) Applicant: Cataler Corporation, Kakegawa-shi, Shizuoka (JP)

(72) Inventors: Hiroshi Sekine, Kakegawa (JP); Hiroki Nagashima, Kakegawa (JP); Naohiro Takaoka, Kakegawa (JP); Minoru Ito, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/617,778

(22) Filed: Jun. 8, 2017

(65) Prior Publication Data

US 2017/0274412 A1  Sep. 28, 2017

Related U.S. Application Data

(63) Continuation of application No. PCT/JP2016/057328, filed on Mar. 9, 2016.

(30) Foreign Application Priority Data

Mar. 9, 2015  (JP) .................. 2015-046249

(51) Int. Cl.
| | |
|---|---|
| B05C 11/06 | (2006.01) |
| B01D 53/94 | (2006.01) |
| B01J 35/04 | (2006.01) |
| B01J 37/02 | (2006.01) |
| B05C 7/04 | (2006.01) |
| B01D 67/00 | (2006.01) |

(52) U.S. Cl.
CPC .............. *B05C 11/06* (2013.01); *B01D 53/94* (2013.01); *B01D 67/0046* (2013.01); *B01J 35/04* (2013.01); *B01J 37/0215* (2013.01); *B05C 7/04* (2013.01); *B01D 2255/1021* (2013.01); *B01D 2255/1023* (2013.01); *B01D 2258/01* (2013.01); *B01D 2323/42* (2013.01)

(58) Field of Classification Search
USPC ............ 118/306, 317, 62, 63, 602, 410–412, 118/407–408
See application file for complete search history.

(56) References Cited

FOREIGN PATENT DOCUMENTS

| | | |
|---|---|---|
| JP | 60-012136 A | 1/1985 |
| JP | 60-216848 A | 10/1985 |
| | (Continued) | |

OTHER PUBLICATIONS

International Search Report in connection with PCT International Application No. PCT/JP2016/057328.
(Continued)

*Primary Examiner* — Yewebdar T Tadesse
(74) *Attorney, Agent, or Firm* — John P. White; Cooper & Dunham LLP

(57) ABSTRACT

A coating apparatus includes: a supply frame for supplying slurry into channels from one end of a honeycomb substrate; and a blower for evacuating a wind box. An annular resistive member is attached to the circumference of the opening of the wind box, and the honeycomb substrate is arranged, with a spacer placed on the resistive member. When the blower is operated and the slurry is supplied, the coat width of the slurry coated on the inner surfaces of the channels in an outer circumferential area is less than the coat width of the slurry coated on the inner surfaces of the channels in a center area.

20 Claims, 10 Drawing Sheets

(56) References Cited

FOREIGN PATENT DOCUMENTS

| | | |
|---|---|---|
| JP | 2000-202304 A | 7/2000 |
| JP | 2004-141703 A | 5/2004 |
| JP | 2007-268484 A | 10/2007 |
| JP | 2009-136833 A | 6/2009 |

OTHER PUBLICATIONS

Notification of Transmittal of Translation of the International Preliminary Report on Patentability (Chapter I or Chapter II) dated Sep. 21, 2017 in connection with PCT International Application No. PCT/JP2016/057328 including an English language translation of the International Preliminary Report on Patentability.

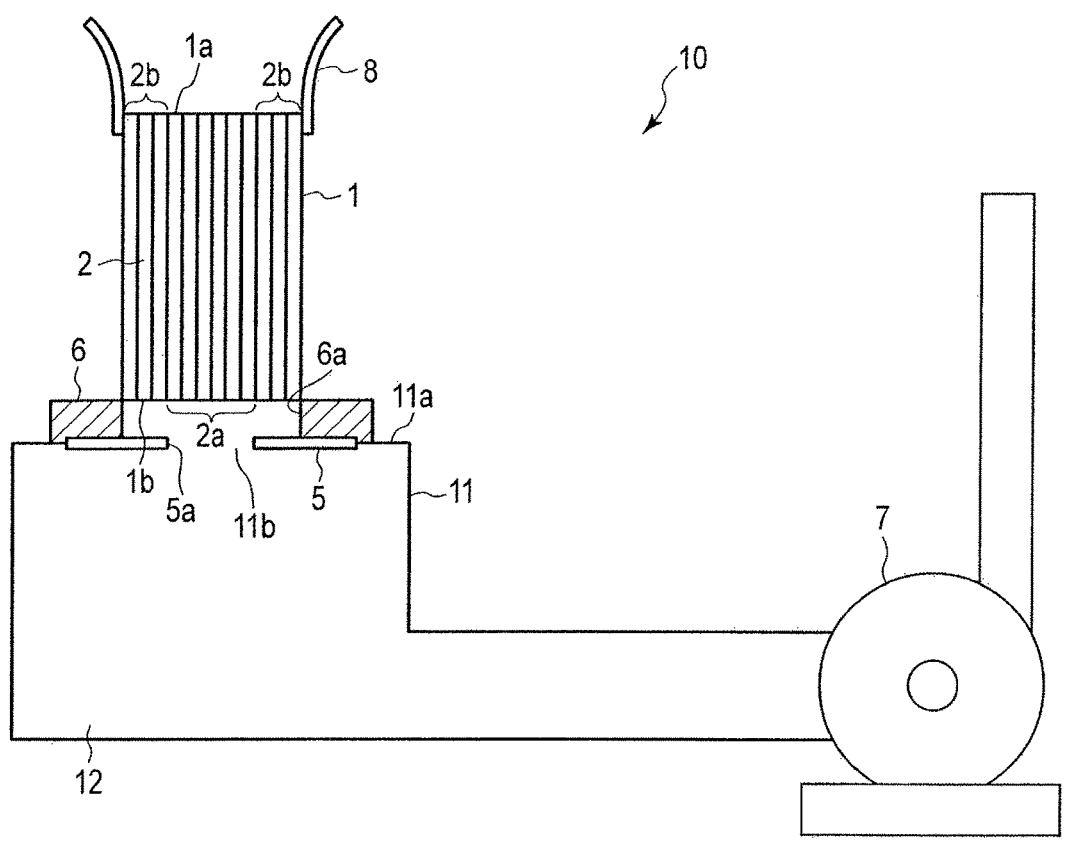
F I G. 1

| Type | Thickness of spacer (clearance between net and substrate) |
|---|---|
| Net (with a mesh of 250) | No clearance (0 mm) |
| | 0.9mm |
| | 1.8mm |
| | 6.3mm |
| | 12.4mm |
| | 14mm |
| Net (with a mesh of 200) | No clearance (0 mm) |
| Plate | 1.8mm |
| | 6.3mm |
| | 12.4mm |
| | 14mm |
| None (comparative example) | No clearance (0 mm) |
F I G. 5
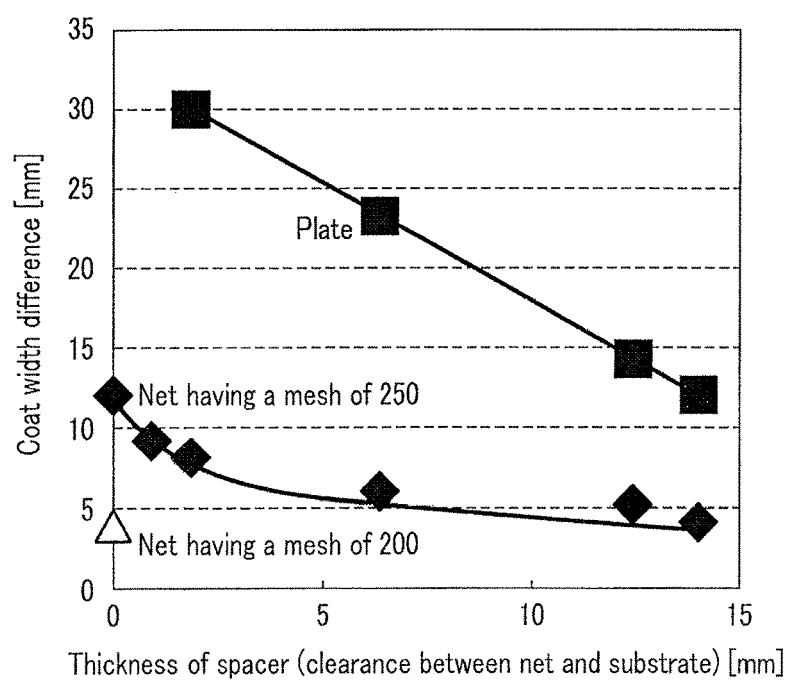
F I G. 6

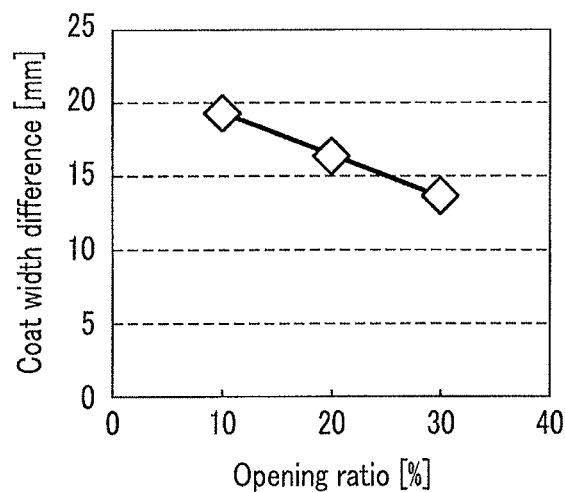
F I G. 8
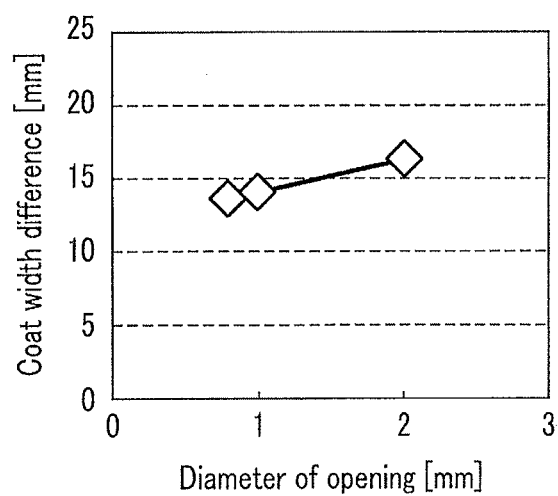
F I G. 9

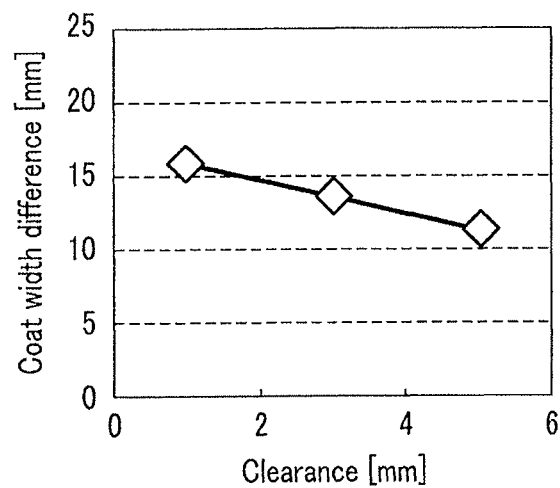
F I G. 10
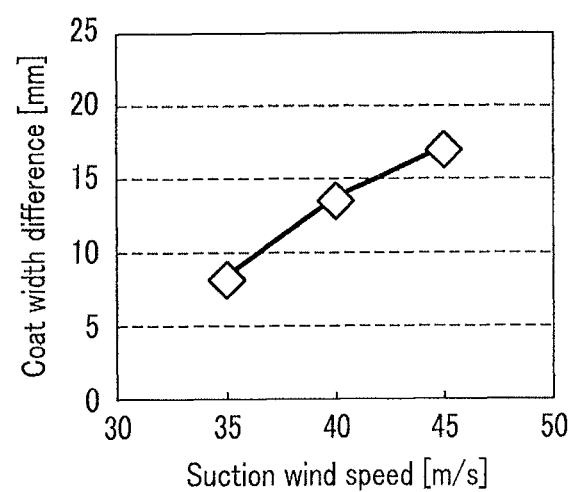
F I G. 11

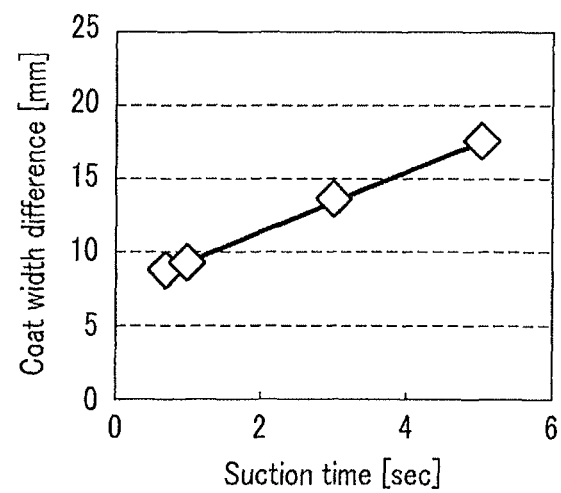
F I G. 12
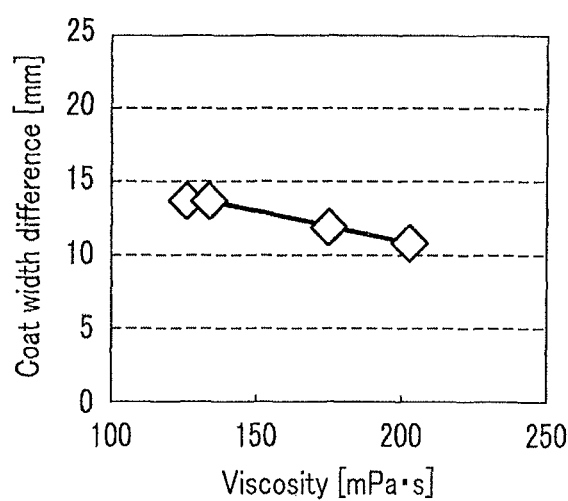
F I G. 13

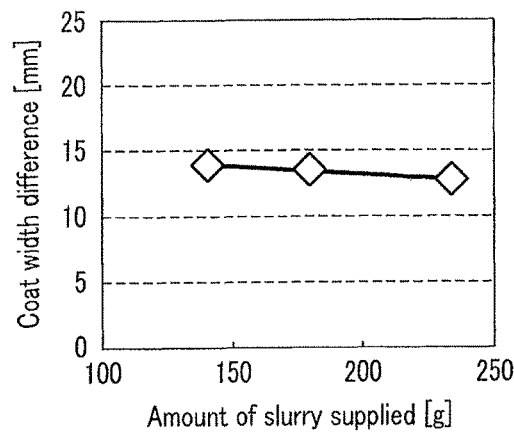
F I G. 14
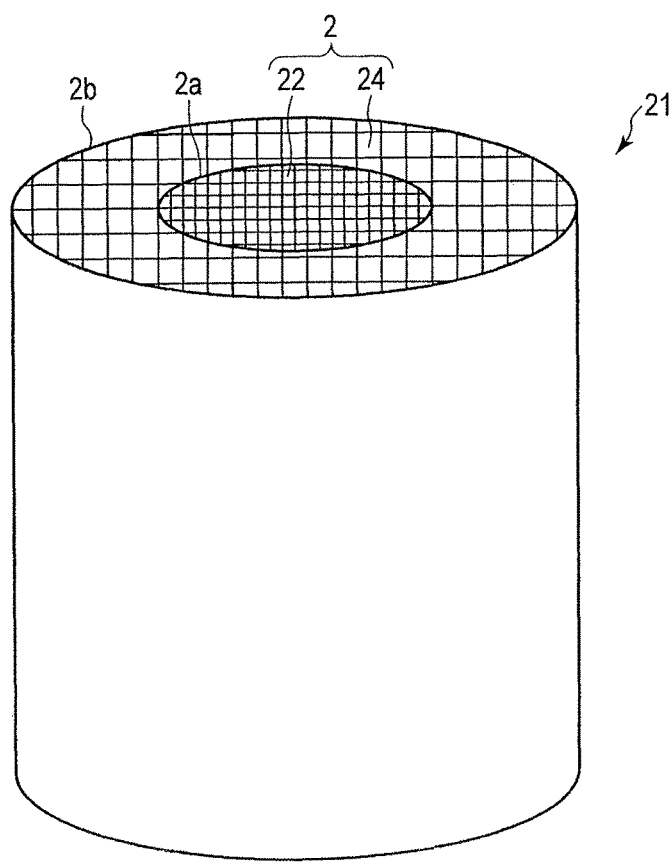
F I G. 15

APPARATUS FOR COATING CATALYST SLURRY

CROSS-REFERENCE TO RELATED APPLICATIONS

This application is a Continuation Application No. PCT/JP2016/057328, filed Mar. 9, 2016 and based upon and claiming the benefit of priority from Japanese Patent Application No. 2015-046249, filed Mar. 9, 2015, the entire contents of which are incorporated herein by reference.

FIELD

The present invention relates to an apparatus for coating slurry containing a catalyst material on a monolithic catalyst honeycomb substrate used for purifying the exhaust gas of an automobile.

BACKGROUND

A purification apparatus using a monolithic catalyst is conventionally known as an apparatus for purifying the exhaust gas of an automobile. The monolithic catalyst includes a substantially cylindrical honeycomb substrate having a large number of parallel channels for permitting a gas to flow in one direction, and slurry containing a catalyst material is coated on the inner surfaces of the channels of the honeycomb substrate. When the exhaust gas flows through the channels of the monolithic catalyst in the axial direction of the honeycomb substrate, chemical reaction takes place between the exhaust gas and the catalyst material, and the exhaust gas is purified thereby.

When the exhaust gas flows through the cylindrical monolithic catalyst, the exhaust gas flowing through the circumferential channels does not pass as smoothly as the exhaust gas flowing through the central channels as viewed in the radial direction of the monolithic catalyst. For this reason, the exhaust gas purification effect is lower in the circumferential portions of the monolithic catalyst than in the central portion thereof.

In an effort to solve this problem, various measures are taken to improve the exhaust gas purification effect at the time of manufacturing the catalyst, such as coating a larger amount of slurry in the central portion of the honeycomb substrate than in the circumferential portions thereof. For example, in the coating apparatus disclosed in Jpn. Pat. Appln. KOKAI Publication No. 2009-136833, a resistive member such as a net member or a plate member is arranged on the slurry supply side of the honeycomb substrate in such a manner that the slurry flow is decelerated in the circumferential portions and consequently the slurry is provided more in the central portion than in the circumferential portions.

SUMMARY

However, where a resistive member is arranged on the slurry supply side of the honeycomb substrate, as in the coating apparatus disclosed in Jpn. Pat. Appln. KOKAI Publication No. 2009-136833, the slurry inevitably attaches to the resistive member and remains on it, resulting in an increase in the amount of slurry consumed. Since the catalyst material included in the slurry contains a noble metal such as platinum or palladium, the manufacturing cost of the monolithic catalyst increases in accordance with an increase of the amount of slurry consumed. In addition, if the slurry attaches to the resistive member ununiformly, the amount of slurry coated on the honeycomb substrate may also become ununiform, with the result that monolithic catalysts may vary in quality.

If the slurry attaching to the resistive member dries and hardens, agglomerates of such slurry may be mixed in the liquid slurry to be coated. If this happens, the agglomerates may enter and clog the channels. As a result, the monolithic catalyst may be degraded in performance and quality.

Where a resistive member is arranged on the slurry supply side, an inorganic oxide included in the slurry acts as an abrasive, and the resistive member is abraded thereby. That is, the resistive member has to be replaced with a new one after a certain period of time. This also increases the manufacturing cost of the monolithic catalyst.

Accordingly, an object of the present invention is to provide a catalyst slurry coating apparatus which enables a monolithic catalyst improved in quality and performance to be manufactured at low cost.

A coating apparatus for coating catalyst slurry according to the present invention is coating slurry containing a catalyst material on inner surfaces of a plurality of channels which extend through a substrate in a first direction and are adjacent to one another. The coating apparatus comprising slurry supply means for supplying the slurry into the channels from one end of the substrate, as defined in the first direction, air stream generation means for generating air streams flowing through the channels from the one end of the substrate to another end, as defined in the first direction, such that the slurry supplied from the one end of the substrate by the slurry supply means flows from the one end of the substrate through the channels toward said another end and reaches an intermediate point, as defined in an overall length of the substrate, and air stream suppression means, arranged away from said another end of the substrate and facing downstream-side ends of first channels, as viewed in the first direction, for suppressing the air streams in the first channels such that the air streams in the first channels are slower than the air streams in second channels.

BRIEF DESCRIPTION OF DRAWINGS

FIG. 1 is a schematic view showing a coating apparatus according to an embodiment.

FIG. 5 is a table illustrating a combination example of how the thickness of a spacer is varied using either the net member shown in FIG. 3 or the plate shown in FIG. 4.

FIG. 6 is a graph illustrating how the coat width difference of slurry is related, based on the table shown in FIG. 5.

FIG. 8 is a graph illustrating how the coat width difference of slurry varies when a parameter (an opening ratio) of the coating apparatus is changed.

FIG. 9 is a graph illustrating how the coat width difference of slurry varies when a parameter (the diameter of a channel) of the coating apparatus is changed.

FIG. 10 is a graph illustrating how the coat width difference of slurry varies when a parameter (a clearance) of the coating apparatus is changed.

FIG. 11 is a graph illustrating how the coat width difference of slurry varies when a parameter (a suction wind speed) of the coating apparatus is changed.

FIG. 12 is a graph illustrating how the coat width difference of slurry varies when a parameter (a suction time) of the coating apparatus is changed.

FIG. 13 is a graph illustrating how the coat width difference of slurry varies when a parameter (the viscosity of slurry) of the coating apparatus is changed.

FIG. 14 is a graph illustrating how the coat width difference of slurry varies when a parameter (the amount of slurry supplied) of the coating apparatus is changed.

FIG. 15 is a perspective view illustrating another example of a honeycomb substrate to be used in the coating apparatus depicted in FIG. 1.

DESCRIPTION

Hereinafter, embodiments will be described in detail with reference to the accompanying drawings.

FIG. 1 is a schematic view showing an example of a coating apparatus 10 configured to coat slurry on the inner surfaces of channels of a honeycomb substrate 1. The slurry contains, for example, a catalyst material for purifying the exhaust gas of an automobile. The catalyst material includes a noble metal such as platinum or palladium. The coating apparatus 10 of the embodiment is an apparatus for manufacturing a monolithic catalyst used for purify the exhaust gas of an automobile.

The exhaust gas of an automobile provides different flow rate distributions, depending upon the type of automobile, when it is made to flow through the monolithic catalyst. In addition, the exhaust gas flows in different ways, depending upon the canning shape of the catalyst and the bent state of a pipe. In order to improve the exhaust gas purification effect, it is preferred that the coat shape of the slurry for the honeycomb substrate 1 be changed in accordance with the type of automobile or the installation position of the catalyst. The coating apparatus 10 of the present embodiment enables control of the slurry coat shape for the honeycomb substrate 1.

Figure 2:
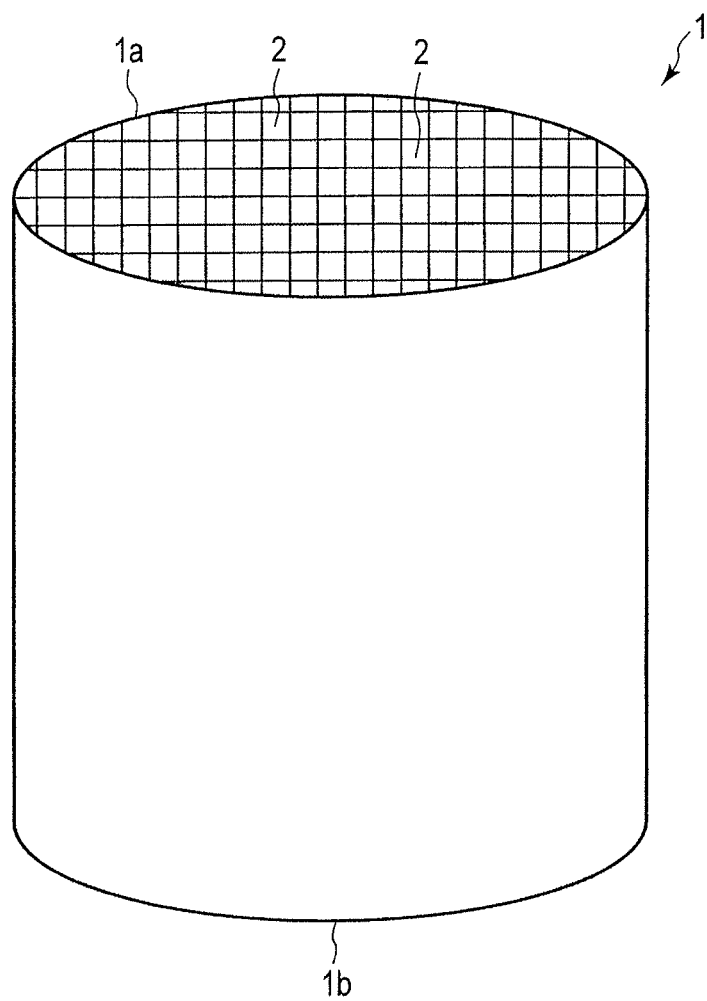
FIG. 2 is a perspective view illustrating an example of a honeycomb substrate to be used in the coating apparatus depicted in FIG. 1.

As shown, for example, in FIG. 2, the honeycomb substrate 1 has a substantially cylindrical outer shape, and a plurality of channels 2 extending in the axial direction are defined inside the honeycomb substrate 1. In FIG. 1, the channels 2 are indicated by solid lines for the sake of easy understanding though they cannot be viewed in actuality. The channels 2 extend in the axial direction and are arranged in parallel to one another. In the present embodiment, all the channels 2 have the same cross sectional area. The cross sectional shape of each channel 2 may be any desirable shape, including circular shape and hexagonal shape. The honeycomb substrate 1 may be fabricated using such a ceramic material as cordierite, or stainless steel.

Figure 3:
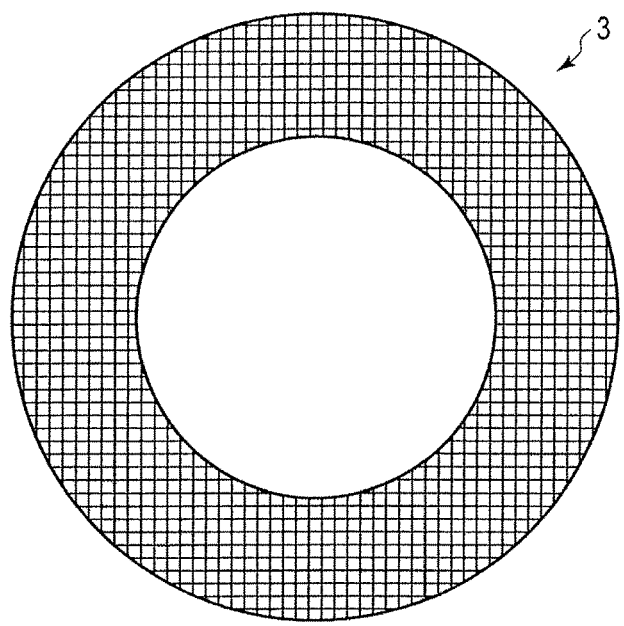
FIG. 3 is a plan view illustrating an annular net member employed in the coating apparatus depicted in FIG. 1.
Figure 4:
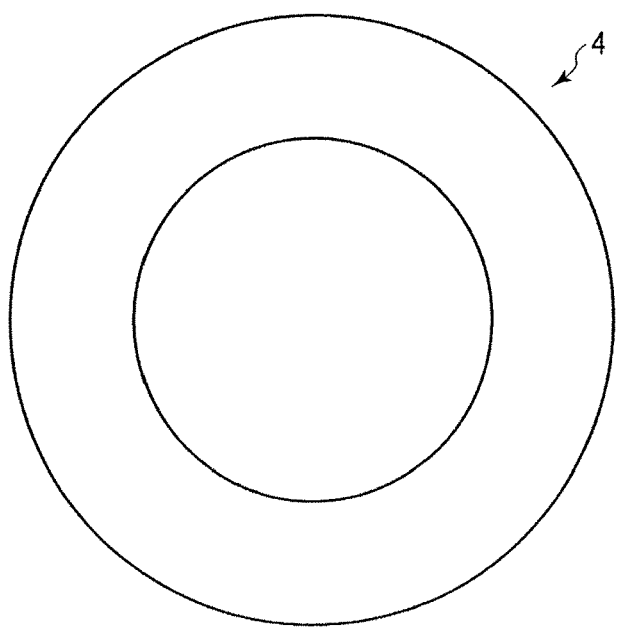
FIG. 4 is a plan view illustrating an annular plate employed in the coating apparatus depicted in FIG. 1.

The coating apparatus 10 is provided with a support base 11 for supporting the axially lower end 1b of the honeycomb substrate 1. The support base 11 is hollow and functions as a wind box 12. The top plate 11a of the support base 11 has a circular opening 11b communicating with the hollow section of the wind box 12. A resistive member 5 (air stream suppression means), such as the annular net (net member) 3 shown in FIG. 3 or the annular plate (plate member) 4 shown in FIG. 4, is attached to the circumference of the opening 11b. An annular spacer 6 (adjusting means) is arranged between the resistive member 5 and the lower end 1b of the honeycomb substrate 1 in such a manner that the honeycomb substrate 1 is located at a position above the resistive member 5, as viewed in FIG. 1. That is, the distance between the resistive member 5 and the lower end 1b of the honeycomb substrate 1 can be changed in accordance with the thickness of the spacer 6.

The coating apparatus 10 is provided with a blower 7 (air stream generation means) which evacuates the hollow section of the wind box 12. Although the blower 7 is employed as the air stream generation means in the present embodiment, compressed air may be supplied to the channels 2 from the upper end 1a of the honeycomb substrate 1 to cause air streams flowing through the channels 2.

When the blower 7 is driven in the state where the honeycomb substrate 1 is set on the support base 11, with the spacer 6 interposed, the hollow section of the wind box 12 is evacuated, causing a negative pressure in the opening 11b. As a result, air flows through the channels 2 from the upper end 1a of the honeycomb substrate 1 to the lower end 1b thereof. Then, slurry is supplied from a funnel-shaped supply frame 8 (supply means) attached to the upper end 1a of the honeycomb substrate 1. The slurry is sucked into the channels 2 from the upper end 1a of the honeycomb substrate 1, and the inner surfaces of the channels 2 are coated with the slurry.

The amount of slurry to be supplied is determined in such a manner that when all of the slurry supplied at one time is made to flow from the supply frame 8 into the channels 2, the slurry reaches an intermediate point of the overall length of the channels 2. In other words, according to the coating apparatus 10 of the embodiment, the slurry does not flow out of the lower end 1b of the honeycomb substrate 1, and the resistive member 5 does not get wet with the slurry. Since the slurry is hardly wasted, the manufacturing cost can be lowered, accordingly.

The spacer 6 has a circular opening 6a having substantially the same diameter as the outer diameter of the honeycomb substrate 1. Likewise, the support base 11 has a circular opening 11b having substantially the same diameter as the outer diameter of the honeycomb substrate 1. Let us assume that the blower 7 is driven in the state where the resistive member 5 is not attached to the circumference of the opening 11b of the support base 11. In this case, the air in every channel 2 of the honeycomb substrate 1 flows at the same speed, and the slurry coat width is substantially the same for all channels 2. The "slurry coat width" is intended to refer to the distance between the upper end 1a of the honeycomb substrate 1 to a position which the slurry reaches.

According to the present embodiment, the blower 7 is driven and the slurry is supplied in the state (the state shown in FIG. 1) where the annular resistive member 5 is attached to the circumference of the opening 11b of the support base 11. In this case, the suction force with which the slurry is sucked into the channels 2 (first channels) located in the outer circumferential area 2b radially outward of the honeycomb substrate 1 is weaker than the suction force with which the slurry is sucked into the channels 2 (second channels) located in the center area 2a close to the radial center of the honeycomb substrate 1. As a result, the slurry coat width differs between the channels 2 located in the center area 2a of the honeycomb substrate 1 and the channels 2 located in the outer circumferential area 2b.

The resistive member 5 has an opening smaller than the outer diameter of the honeycomb substrate 1 and faces the channels 2 (first channels) located in the radially outward of the honeycomb member 1, namely, the outer circumferential area 2b. The opening 5a of the resistive member 5 oppose to the channels 2 (second channels) located in the center area 2a. With this structure, the speed of the air flow is lower in the channels 2 located in the outer circumferential area 2b which the resistive member 5 faces than in the channels 2 in the center area 2a. As a result, the slurry coat width is shorter in the outer circumferential area 2b than in the center area 2a.

In order to control the coat width difference (i.e., the difference between the slurry coat width in the outer circumferential area 2b and the slurry coat width in the center area 2a) to be a desirable value, the inventors measured the coat width difference, using different types of resistive members 5 (the net member 3 and the plate member 4) and spacers 6 having different thicknesses (the thickness of a spacer 6 is equal to the distance between the honeycomb substrate 1 and the resistive member 5), and examined how the types of resistive member 5 and the thickness of a spacer 6 had an effect on the coat width difference. An example of the combination between the types of resistive member 5 and the thicknesses of the spacers 6 is shown in FIG. 5. The measurements of the coat width difference are shown in FIG. 6.

The other measurement conditions were determined as follows:
the outer diameter of the honeycomb substrate 1: 103 mm
the outer diameter of the resistive member 5: 103 mm, the inner diameter of the opening 5a: 60 mm
the mesh of the net member 3: 250
the solid component of the slurry: 30%, the viscosity: 0.4 s-1 . . . 4000 mPa·s, the coating amount: 250 g
the suction time by the blower 7: 5 sec, wind speed: 40 m/s The wind speed of the air flow caused by the blower 7 was measured before the slurry was supplied.

Under the above conditions, the honeycomb substrate 1 was coated with the slurry. After the slurry dried, the center of the honeycomb substrate 1 was cut in the longitudinal direction (first direction), and the coat width difference of the slurry was measured in practice.

The results are shown in FIG. 6. As can be seen, it was found that in both the case where the plate 4 was employed as the resistive member 5 and the case where the net member 3 was employed as the resistive member 5, the coat width difference tended to increase when the distance (clearance) between the lower end 1b of the honeycomb substrate 1 and the resistive member 5 (namely, the thickness of the spacer 6) was short, and tended to decrease when the distance was long. The results are attributable to the fact that the resistive member 5 provided close to the honeycomb substrate 1 slows the speed of the air streams at the exit of the channels 2 located in the outer circumferential area 2b which the resistive member 5 faces.

In other words, it was found that the coat width difference could be controlled by changing the distance between the lower end 1b of the honeycomb substrate 1 and the resistive member 5, namely, the thickness of the spacer 6. That is, with respect to the channels 2 in the center area 2a which faces to the opening 5a and is not influenced by the resistive member 5, the slurry coat width does not vary in accordance with the thickness of the spacer 6. The coat width varies in accordance with the thickness of the spacer 6 only in the channels 2 in the outer circumferential area 2b. It is also found that if the resistive member 5 is away from the honeycomb substrate 1 more than 30 mm, the slurry coat width remains substantially the same as the case where the resistive member 5 is not provided.

Where the net member 3 is used as the resistive member 5, it can be arranged in contact with the honeycomb member 1, without using the spacer 6. Where the plate 4 is used, it must be away from the lower end 1b of the honeycomb substrate 1. Even where the net member 3 is employed, it should not be arranged in contact with the lower end of the honeycomb substrate 1.

If the net member 3 is in contact with the lower end 1b of the honeycomb substrate 1, it may happen that the honeycomb substrate 1 will break or crack. To prevent the honeycomb substrate 1 from breaking, the honeycomb substrate 1 may be brought into contact with the net member 3 at a low speed (slowly) when the honeycomb substrate 1 is set. If this is done, however, the takt time is inevitably long, and the productivity lowers. It may be thought to make the net member 3, using a material softer than the material of the honeycomb substrate 1. If this is done, however, the net member 3 is not rigid and is easy to deform. Such a soft net member may not satisfactorily function as the resistive member 5.

In the present embodiment, the resistive member 5 (even where the net member 3 is used) is arranged at a position away from the lower end 1b of the honeycomb substrate 1. As described above, in order to provide the coat width difference, the distance between the lower end 1b of the honeycomb substrate 1 and the resistive member 5 should be more than 0 mm and less than 30 mm. In practice, if the distance exceeds 15 mm, the coat width difference becomes 10 mm or less. Under the circumstances, the resistive member 5 should be away from the honeycomb substrate 1, and the distance between them should desirably be 20 mm or less.

Figure 7:
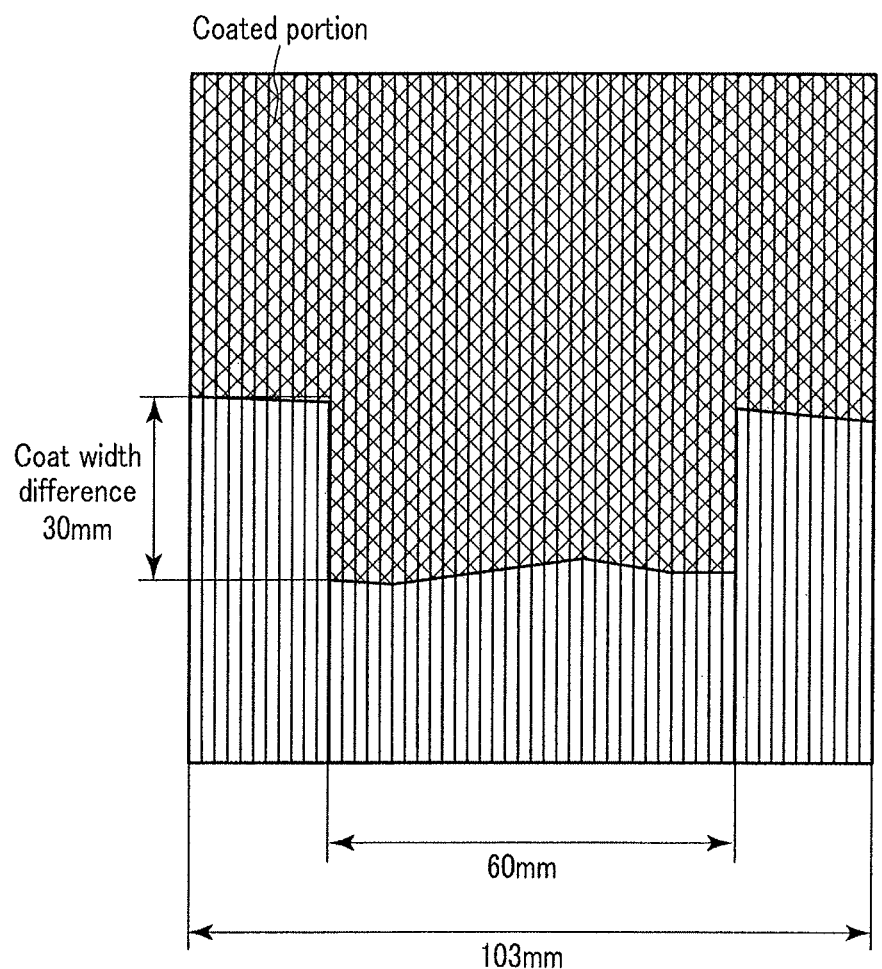
FIG. 7 is a sectional view of an actual honeycomb substrate and illustrating an example of the coat width difference of FIG. 6 based on the table shown in FIG. 5.

As shown in FIG. 6 (which illustrates the case where the net member 3 is employed as the resistive member 5 and the case where the plate 4 is employed as the resistive member 5), the coat width difference is larger in the case where the plate 4 is employed than in the case where the net member 3 is employed, provided that the thickness of the spacer 6 is the same. This is attributable to the fact that the air can flow through the net member 3, whereas the air cannot flow through the plate 4. That is, the use of the plate member 4 as the resistive member 5 is effective in providing a comparatively large coat width difference. As can be seen in FIG. 6, where the plate 4 is arranged at a position 1.8 mm away from the lower end 1b of the honeycomb substrate 1, the coat width difference is maximal, and the air stream can be suppressed most effectively. How the slurry is actually coated on the honeycomb substrate 1 at the time is shown in FIG. 7.

Where a comparatively-large-mesh net member 3 having a mesh of 200 is arranged in contact with the lower end 1b of the honeycomb substrate 1, the coat width difference is less than 5 mm, as shown in FIG. 6. In this case, the net member 3 hardly functions as the resistive member 5. That is, the net member 3 hardly functions as the resistive member 5 unless it has a mesh smaller than 200 mesh.

As should be clear from the above, in order to control the coat width difference, the type of resistive member 5 (including the mesh of a net member) should be properly selected, and the thickness of the spacer 6 has to be properly determined. Needless to say, the slurry coat shape on the honeycomb substrate 1 can be changed in accordance with the shape of the resistive member 5 and the position at which the resistive member 5 is arranged in the plane orthogonal to the axial direction of the honeycomb substrate 1.

In the following, other conditions having an effect on the coat width difference will be considered. Parameters having an effect on the coat width difference include the clearance between the resistive member 5 and the honeycomb substrate 1, the type of resistive member 5, the opening ratio of the resistive member 5 (plate 4'), the diameter of the channels 2 of the honeycomb substrate 1, the suction wind speed provided by the blower 7, the suction time, the viscosity of the slurry, the amount of slurry coated, etc.

As basic conditions, a honeycomb substrate having a diameter of 103 mm and an axial length of 83 mm was set on the coating apparatus 10, a plate 4' (not shown) having a large number of openings (0.8 mmϕ) was arranged at a position 3 mm away from the lower end 1b of the honeycomb substrate 1, slurry having a viscosity of 130 mPas was supplied in an amount of 180 g, and the blower 7 was operated such that the suction wind speed was 40 m/s and the suction time was 3 sec. A simulation was performed based on these basic conditions. The opening ratio of the plate 4' (the ratio of the total area of the openings to the area of the plate 4' without the opening 5a) was set at 30%. The simulation result of the coat width difference obtained when the slurry was coated under the basic conditions was 13.6 mm.

How the coat width difference varied was examined by changing the parameters one by one. The results of examination are shown in FIGS. 8 to 14.

As shown in FIG. 8, the less the opening ratio of the plate 4' is (i.e., the smaller the number of openings is), the smaller amount of air flowing through the openings of the plate 4'. As a result, the coat width difference increases. Conversely, the more the opening ratio of the plate 4' is, the larger amount of air flowing through the openings of the plate 4'. As a result, the coat width difference decreases. If the opening ratio of plate 4' is decreased and the amount of air following through the openings is decreased, the slurry coating portion on the channels 2 in the center area 2a of the honeycomb member 1 and the slurry coating portion on the channels 2 in the outer circumferential area 2b are known to form a steep step shape. If the opening ratio of plate 4' is increased and the amount of air following through the openings is increased, the slurry coating portions are known to form a gentle step shape.

As shown in FIG. 9, even if the openings of the plate 4' are changed in diameter (with the opening ratio kept constant), the coat width difference remains substantially the same.

As shown in FIG. 10, if the clearance between the lower end 1b of the honeycomb substrate 1 and plate 4' is decreased, the air does not flow smoothly through the channels 2 facing the plate 4'. As a result, the coat width difference increases. Conversely, if the clearance between the lower end 1b of the honeycomb substrate land plate 4' is increased, the air flows smoothly in the channels 2 facing the plate 4'. As a result, the coat width difference decreases. If the clearance of the plate 4' relative to the honeycomb substrate 1 is decreased, the slurry coating portion on the channels 2 in the center area 2a of the honeycomb member 1 and the slurry coating portion on the channels 2 in the outer circumferential area 2b are known to form a steep step shape, and that if the clearance of the plate 4' relative to the honeycomb substrate 1 is increased, the slurry coating portions are known to form a gentle step shape.

As shown in FIG. 11, if the suction wind speed by the blower 7 is decreased, the air flows slowly in the channels 2 facing the opening 5a as well, resulting in a small coat width difference. Conversely, if the suction wind speed by the blower 7 is increased, the air flows rapidly in the channels 2 facing the opening 5a as well, resulting in a large coat width difference. If the suction wind speed by the blower 7 is decreased, the slurry coating portion on the channels 2 in the center area 2a of the honeycomb member 1 and the slurry coating portion on the channels 2 in the outer circumferential area 2b are known to form a gentle step shape, and that if that suction wind speed is increased, the slurry coating portions are known to form a steep step shape.

As shown in FIG. 12, if the suction time of the blower 7 is short, the amount of air stream (the amount of flowing air) is small, resulting in a small coat width difference. Conversely, if the suction time of the blower 7 is long, the amount of air stream (the amount of flowing air) is large, resulting in a large coat width difference.

As shown in FIG. 13, if the viscosity of the slurry is decreased, the air flows easily in the channels 2 facing the opening 5a, resulting in a large coat width difference. Conversely, if the viscosity of the slurry is increased, the air flows slowly in the channels 2 facing the opening 5a, resulting in a small coat width difference.

As shown in FIG. 14, even if the amount of slurry supplied is changed, the coat width difference remains substantially the same.

Provided that the above-mentioned parameters of the coating apparatus 10 are set at appropriate values, the present embodiment enables the coat width difference between the center area 2a of the honeycomb substrate 1 and the outer circumferential area 2b of the honeycomb substrate 1 to be controlled at a desired value by simply adjusting the thickness of the spacer 6 for example. Accordingly, a monolithic catalyst improved in both quality and performance can be manufactured at lost cost and with a simple structure.

In the above-mentioned embodiment, the slurry coat width is controlled to be shorter in the outer circumferential area 2b than in the center area 2a, because the air tends to flow at a lower speed through the channels 2 of the outer circumferential area 2b of the honeycomb substrate 1 than through the channels 2 of the center area 2a. However, it is preferred that the air flow speed through the channels 2 of the outer circumferential area 2b be equal to the air flow speed through the channels 2 of the center area 2a. For this purpose, it is thought to increase the diameter of the channels 2 of the outer circumferential area 2b to be larger than the diameter of the channels 2 of the center area 2a.

In recent years, monolithic catalysts are being developed wherein the diameter of the channels 2 of the outer circumferential area 2b of the honeycomb substrate 1 is larger than the diameter of the channels 2 of the center area 2a.

FIG. 15 shows an example of a honeycomb substrate 21 wherein the diameter of channels 22 of the center area 2a is comparatively small and the diameter of channels 24 of the circumferential area 2b surrounding channels 22 is comparatively large. This honeycomb substrate 21 has the same shape and dimensions as the above-described honeycomb substrate 1, except that channels 22 of the center area 2a and channels 24 of the outer circumferential area 2b are different in diameter. To be more specific, in the center area 2a, 600 channels 22 are provided in a square of (1 inch×1 inch), and in the outer circumferential area 2b, 400 channels 24 are provided in a square of (1 inch×1 inch).

Where the diameter of the channels 24 in the outer circumferential area 2b is larger than the diameter of the channels 22 in the center area 2a, the air can easily flow through the channels 24 in the outer circumferential area 2b. As a result, the speed at which the air flows through the channels 22 in the center area 2a and the speed at which the air flows through the channels 24 in the outer circumferential area 2b can be made substantially the same.

Figure 16:
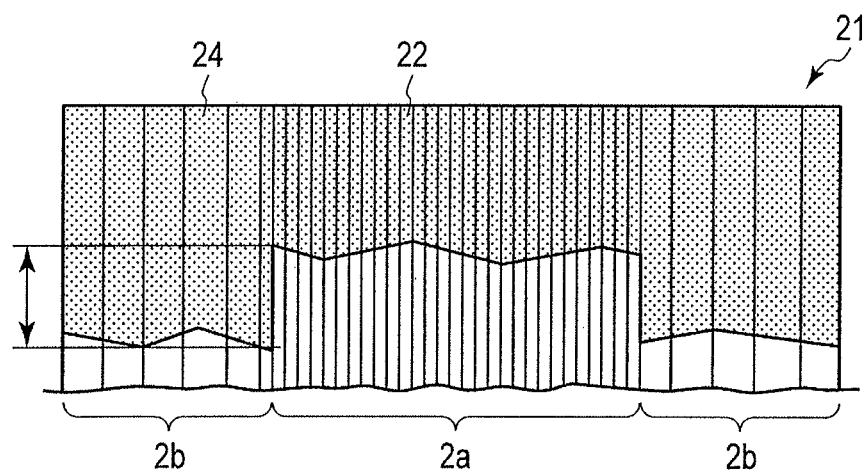
FIG. 16 is a sectional view illustrating a coat shape obtained when slurry is coated for the honeycomb substrate shown in FIG. 15 in the state where no resistive member is employed.

However, where this honeycomb substrate 21 is set in the coating apparatus 10 without the resistive member 5, and slurry is supplied, with an air stream generated in all channels 22 and 24, the slurry flows more smoothly in the channels 24 of the outer circumferential area 2b than in the channels 22 of the center area 2a. As a result, the slurry coat width in the channels 24 of the outer circumferential area 2b is greater than the slurry coat width in the channels 22 of the center area 2a, as shown in FIG. 16.

Figure 17:
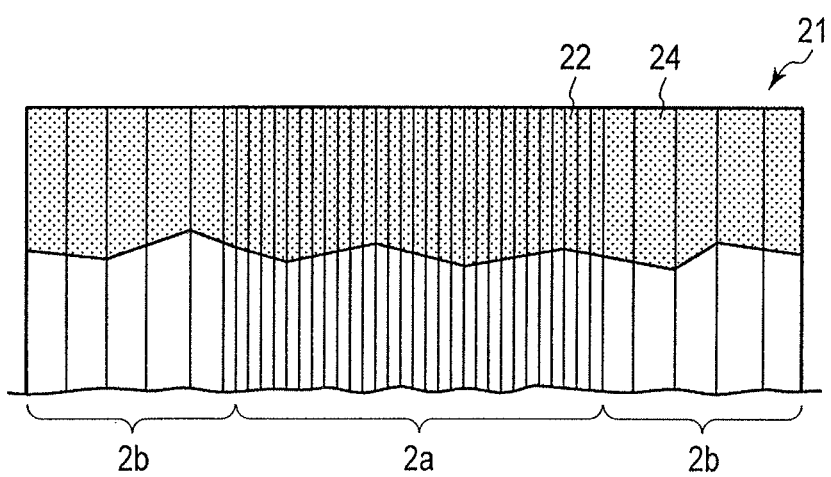
FIG. 17 is a sectional view illustrating a coat shape obtained when slurry is coated for the honeycomb substrate shown in FIG. 15 in the state where a resistive member is employed.

In contrast, where the honeycomb substrate 21 depicted in FIG. 15 is set in the coating apparatus 10 together with the resistive member 5, and slurry is supplied by operating the blower 7, the slurry coat width in the channels 22 of the center area 2a and the slurry coat width in the channels 24 of the outer circumferential area 2b are substantially equal, as shown in FIG. 17. In other words, as long as the above-mentioned parameters of the coating apparatus 10 are set at respective appropriate values, the slurry coat width in the center area 2a and the slurry coat width in the outer circumferential area 2b can be made equal to each other by simply adjusting the thickness of the spacer 6. In the present embodiment, the slurry coat widths of all channels 22 and 24 are made equal to one another by designing the cross sectional area of the channels 24 of the outer circumferential area 2b to be 1.5 times as wide as the cross sectional area of the channels 22 of the center area 2a. It should be noted, however, the optimal cross sectional area ratio can be changed in accordance with the opening ratio of the resistive member 5 or the thickness of the spacer 6.

As another type of monolithic catalyst that comes to be put to practical use, different kinds of slurry (or the same kind of slurry) are coated from the respective axial ends of the honeycomb substrate. The coating apparatus 10 of the present embodiment can be advantageously applied to an apparatus for manufacturing this type of monolithic catalyst. Where this type of monolithic catalyst is manufactured, the coat width of the slurry applied from one end of the honeycomb substrate and the coating width of the slurry applied from the other end of the honeycomb substrate are related to each other, so that it is useful to control the coat widths.

The embodiment described above does not limit the present invention and is presented by way of example. The scope of the invention is in no way restricted by the above-described embodiment. The above embodiment may be modified in various manners without departing from the gist of the invention.

For example, in connection with the above embodiment, reference was made to the case where a resistive member, such as a net member or a plate member, is provided at a position away from the downstream-side end of the honeycomb substrate with respect to the slurry supply direction, and the air flow speed through the channels is made different, depending upon where the channels are located. However, this is not restrictive. Any means may be employed as a resistive member, as long as it can suppress the air flow through the channels in a state where it does not contact the slurry. In the above embodiment, the resistive member opposed to the honeycomb substrate was described as being annular, but the resistive member may have any shape as long as it can be opposed to channels where the slurry coat width should be decreased.

The invention claimed is:

1. A coating apparatus for coating slurry containing a catalyst material on inner surfaces of a plurality of channels which extend through a substrate in a first direction and are adjacent to one another, the coating apparatus comprising:
    slurry supply means for supplying the slurry into the plurality of channels from one end of the substrate, as defined in the first direction, the plurality of channels including (i) first channels located in an outer circumferential area of the substrate, and (ii) second channels located in a center area close to a radial center of the substrate;
    air stream generation means for generating air streams flowing through the plurality of channels from the one end of the substrate to another end, as defined in the first direction, such that the slurry supplied from the one end of the substrate by the slurry supply means flows from the one end of the substrate through the plurality of channels toward said another end and reaches an intermediate point, as defined in an overall length of the substrate; and
    air stream suppression means, arranged away from said another end of the substrate and facing downstream-side ends of the first channels, as viewed in the first direction, for suppressing the air streams in the first channels such that the air streams in the first channels are slower than the air streams in the second channels.

2. The coating apparatus according to claim 1, wherein the first channels and the second channels have an equal cross sectional area, and
    the air stream suppression means causes the air streams in the first channels to be slower than the air streams in the second channels and thereby permits a slurry coat width on the inner surfaces of the first channels, as determined in the first direction, to be shorter than a slurry coat width on the inner surfaces of the second channels, as determined in the first direction.

3. The coating apparatus according to claim 2, further comprising:
    adjusting means for adjusting a distance between said another end of the substrate and the air stream suppression means so as to control a difference between the slurry coat width on the inner surfaces of the first channels and the slurry coat width on the inner surfaces of the second channels.

4. The coating apparatus according to claim 3, wherein the first channels are annularly arranged around the second channels, and
    the air stream suppression means is an annular member facing the downstream-side ends of the first channels, as defined in the first direction.

5. The coating apparatus according to claim 4, wherein the annular member is a plate member that prevents air streams from flowing therethrough.

6. The coating apparatus according to claim 4, wherein the annular member is a net member that permits air streams to flow therethrough.

7. The coating apparatus according to claim 1, wherein the first channels are annularly arranged around the second channels, and the air stream suppression means is an annular member facing the downstream-side ends of the first channels, as defined in the first direction.

8. The coating apparatus according to claim 7, wherein the annular member is a plate member that prevents air streams from flowing therethrough.

9. The coating apparatus according to claim 7, wherein the annular member is a net member that permits air streams to flow therethrough.

10. The coating apparatus according to claim 1, wherein the first channels have a cross sectional area wider than that of the second channels, the air stream suppression means causes the air streams in the first channels to be slower than the air streams in the second channels and thereby permits a slurry coat width on the inner surfaces of the first channels, as determined in the first direction, to be equal to a slurry coat width on the inner surfaces of the second channels, as determined in the first direction.

11. The coating apparatus according to claim 10, further comprising:

adjusting means for adjusting a distance between said another end of the substrate and the air stream suppression means such that the slurry coat width on the inner surfaces of the first channels and the slurry coat width on the inner surfaces of the second channels become equal to each other.

12. The coating apparatus according to claim 11, wherein the first channels are annularly arranged around the second channels, and the air stream suppression means is an annular member facing the downstream-side ends of the first channels, as defined in the first direction.

13. The coating apparatus according to claim 12, wherein the annular member is a plate member that prevents air streams from flowing therethrough.

14. The coating apparatus according to claim 12, wherein the annular member is a net member that permits air streams to flow therethrough.

15. The coating apparatus according to claim 10, wherein the first channels are annularly arranged around the second channels, and the air stream suppression means is an annular member facing the downstream-side ends of the first channels, as defined in the first direction.

16. The coating apparatus according to claim 15, wherein the annular member is a plate member that prevents air streams from flowing therethrough.

17. The coating apparatus according to claim 15, wherein the annular member is a net member that permits air streams to flow therethrough.

18. The coating apparatus according to claim 2, wherein the first channels are annularly arranged around the second channels, and the air stream suppression means is an annular member facing the downstream-side ends of the first channels, as defined in the first direction.

19. The coating apparatus according to claim 18, wherein the annular member is a plate member that prevents air streams from flowing therethrough.

20. The coating apparatus according to claim 18, wherein the annular member is a net member that permits air streams to flow therethrough.

* * * * *